S. FORSYTHE.
SAWMILL CARRIAGE.
APPLICATION FILED JULY 8, 1918.
1,283,490.
Patented Nov. 5, 1918.
2 SHEETS—SHEET 1.
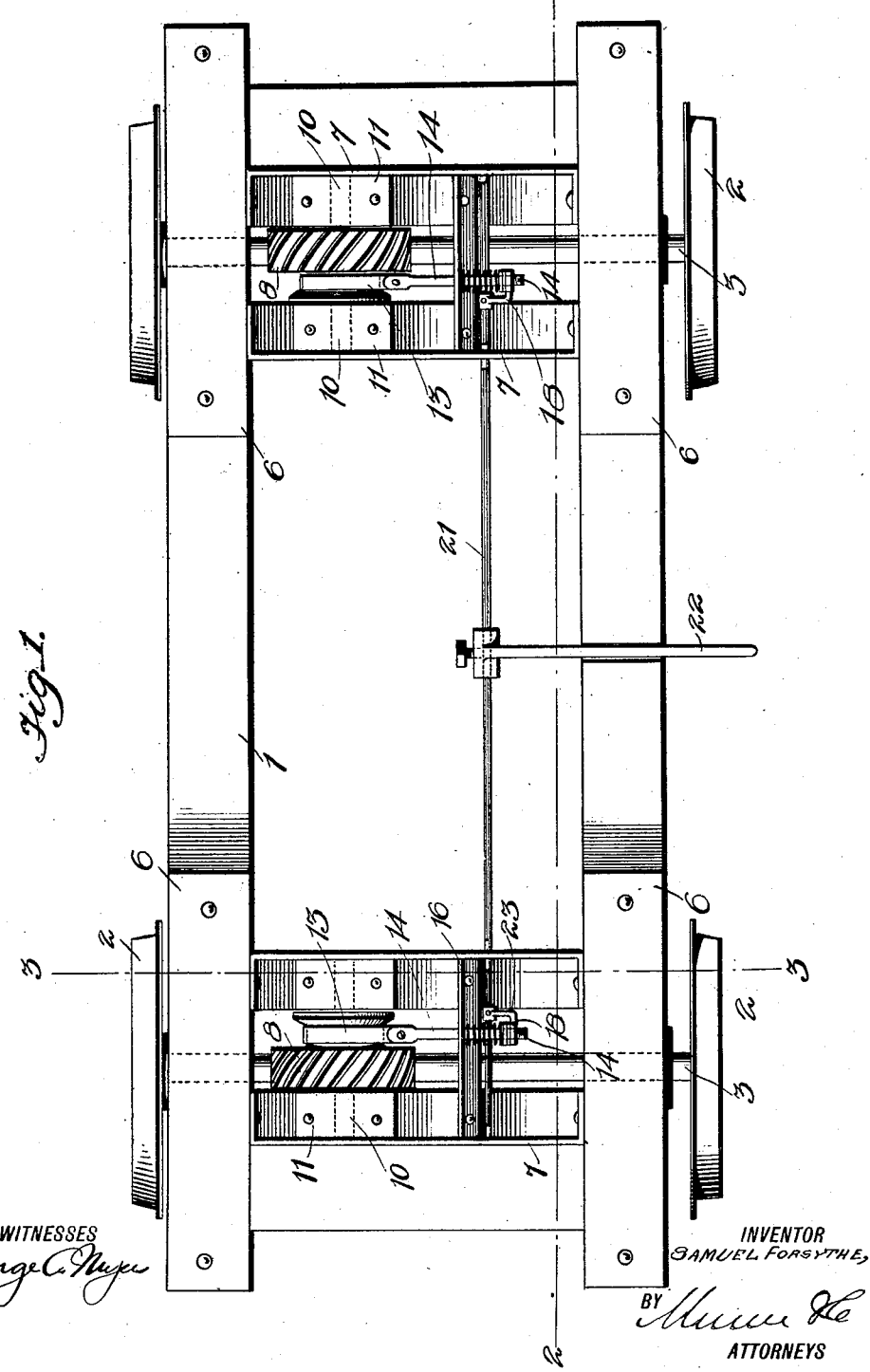

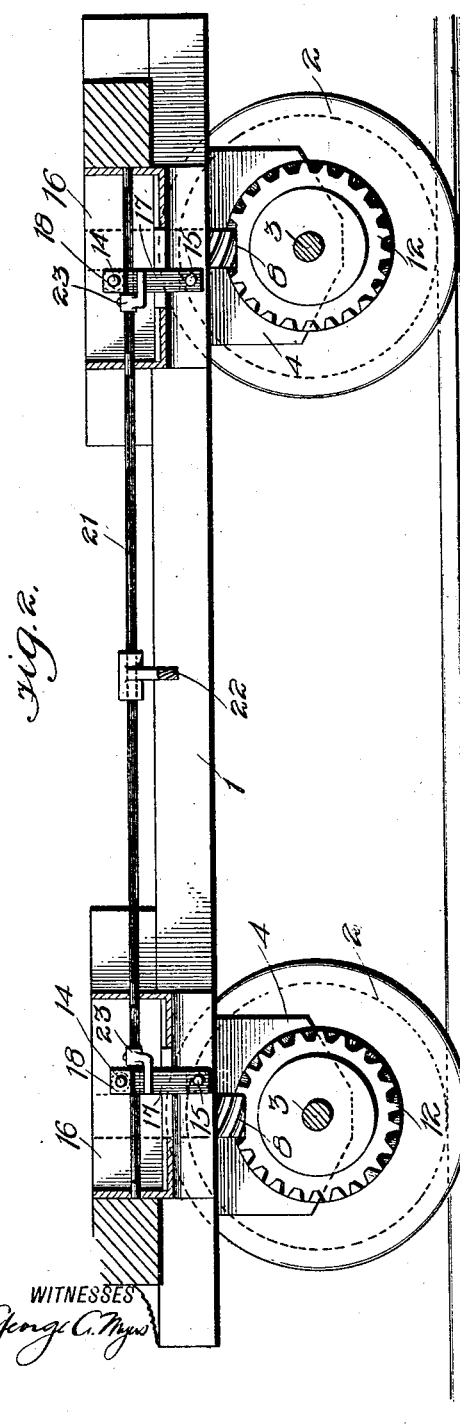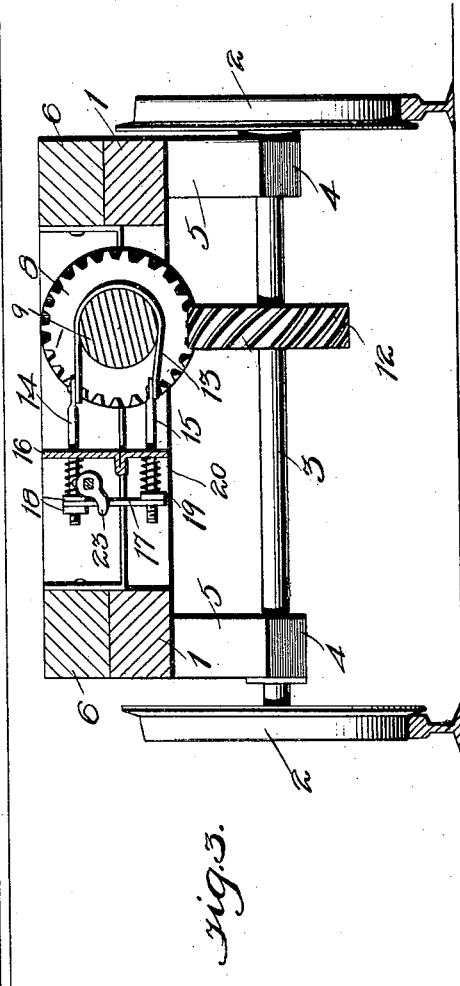

UNITED STATES PATENT OFFICE.

SAMUEL FORSYTHE, OF DAVIS, WEST VIRGINIA.

SAWMILL-CARRIAGE.

1,283,490.

Specification of Letters Patent.

Patented Nov. 5, 1918.

Application filed July 8, 1918. Serial No. 243,819.

*To all whom it may concern:*

Be it known that I, SAMUEL FORSYTHE, a citizen of the United States, and a resident of Davis, in the county of Tucker and State of West Virginia, have invented certain new and useful Improvements in Sawmill-Carriages, of which the following is a specification.

My invention is an improvement in saw mill carriages, and has for its object to provide mechanism in connection with carriages of the character specified for moving the carriage laterally toward and from the saw as it moves longitudinally.

In the drawings:

Figure 1 is a top plan view of a carriage provided with the improved mechanism;

Figs. 2 and 3 are sections on the lines 2—2 and 3—3, respectively, of Fig. 1, each view looking in the direction of the arrows adjacent to the line.

The present embodiment of the invention is shown in connection with the body 1 of a saw mill carriage, the said carriage having the usual wheels 2 which are secured to the axles 3, and the said axles are rotatable and movable longitudinally in bearings 4 on pedestals 5 secured to the lower face of the carriage.

As shown more particularly in Fig. 1, the carriage is composed of longitudinally extending beams, which are connected by cross beams at their ends, and bolster bars 6 are secured to the longitudinally extending beams at their ends. These bolster bars are connected by angle plates 7, and the said plates are spaced apart from each other, being arranged on opposite sides of the adjacent axle.

A worm wheel 8 is arranged between each pair of angle plates, each worm wheel having a hub 9 and having journal pins 10 which are journaled in bearings 11 on the angle plates. Each axle 3 carries a worm wheel 12 which meshes with the adjacent wheel 8, and means is provided for braking each worm wheel 8, to cause the axle adjacent thereto and connected therewith to move longitudinally in its bearings 4.

The said means consists of a strap 13 partially encircling the hub 9, and each end of each strap is connected with one end of a threaded rod 14 and 15, respectively. These rods pass through openings in a plate 16 secured between the adjacent angle plates 7 and extending transversely thereof, and a plate 17 has openings for receiving the threaded ends of the rods 14. Each rod 14 has lock nuts 18 threaded thereon on opposite sides of the plate 17, and a lock nut 19 is threaded on to each rod 15 on the inner side of the plate 17, that is, between the said plate and the plate 16.

Coil springs 20 encircle the rods between the plate 16 and the plate 17, normally acting to tighten the clutch strap on the hub, to brake the rotation of the worm wheel. When the action of the worm wheel is thus braked, it will be evident that such braking action will tend to move the carriage body laterally on the axles, toward and from the saw, the movement toward the saw taking place on the forward movement of the carriage, while the movement from the saw takes place on the rearward movement of the carriage.

Mechanism is provided for releasing the clutches, the said mechanism comprising a shaft 21 which is journaled longitudinally of the frame in the plates 7. This shaft has a lever 22 extending laterally therefrom, intermediate its ends, and in position to be grasped and operated by an operative at the side of the carriage. The said shaft has at each end an angle bar 23, each bar having at one end a bearing engaging the shaft which is squared to receive the bearing, the bearing bore being also squared, and the other arm engages outside of the adjacent plate 17. Thus when the lever 22 is moved downwardly the angle bars 23 will move the plates 17 inwardly, to relax the clutch straps on the hubs of the worm wheels, to permit the said worm wheels to rotate freely, so that the carriage body will not be moved laterally on the axis. It will be obvious that this lever 22 might be arranged at any desired point in the length of the shaft 21, or a lever might be provided at each end of the carriage.

In operation, when the carriage bearing the log is moved toward the saw, the engagement of the worm wheels will constrain the carriage body to move laterally toward the saw, and will hold the carriage in such position with respect to the saw until the saw has passed through the log. When the carriage begins to return, the body will be shifted away from the saw, it being understood that the shifting movement takes place near the beginning of movement of the carriage in either direction.

I claim:

1. In combination with a saw mill carriage comprising a body, axles journaled transversely of the body and movable with respect to the body, means for constraining the carriage body to move laterally on the axles at the beginning of its movement in either direction and releasable at will, said means comprising a worm wheel on each axle, a worm wheel journaled to rotate on an axis extending longitudinally of the carriage and meshing therewith, means for braking the last named worm wheel, said means comprising a hub on the worm wheel, a brake strap encircling the same, springs normally holding the brake straps in engagement with the hub, the releasing means comprising a shaft journaled longitudinally of the carriage, a lever for oscillating said shaft, and means in connection with the shaft for engaging the straps for moving the same against the resistance of the springs.

2. In combination with a saw mill carriage comprising a body, axles journaled transversely of the body and movable with respect to the body, means for constraining the carriage body to move laterally on the axles at the beginning of its movement in either direction and releasable at will, said means comprising a worm wheel on each axle, a worm wheel journaled to rotate on an axis extending longitudinally of the carriage and meshing therewith, means for braking the last named worm wheel, said means comprising a hub on the worm wheel, a brake strap encircling the same, and springs normally holding the brake straps in engagement with the hub.

3. In combination with a saw mill carriage comprising a body, axles journaled transversely of the body and movable with respect to the body, means for constraining the carriage body to move laterally on the axles at the beginning of its movement in either direction and releasable at will, said means comprising a worm wheel on each axle, a worm wheel journaled to rotate on an axis extending longitudinally of the carriage and meshing therewith, and means for braking the last named worm wheel.

SAMUEL FORSYTHE.

Witnesses to signature:
S. G. GAYLEY,
R. C. FORSYTHE.

Copies of this patent may be obtained for five cents each, by addressing the "Commissioner of Patents, Washington, D. C."